United States Patent Office

3,072,581
Patented Jan. 8, 1963

3,072,581
FOAMABLE STYRENE POLYMER COMPOSITIONS AND METHOD FOR PREPARING SAME
Norbert Platzer, Springfield, Mass., assignor to Monsanto Chemical Company, St. Louis, Mo., a corporation of Delaware
No Drawing. Filed May 16, 1958, Ser. No. 735,688
15 Claims. (Cl. 260—2.5)

The present invention relates to foamable styrene polymer compositions and to methods for preparing same.

Styrene polymer foams constitute a valuable class of materials which are finding increasingly wide application in the fabrication of numerous industrial and consumer articles such as life belts, insulation partitions, ice buckets, novelties, etc. Such styrene polymer foams can be prepared by incorporating an aliphatic hydrocarbon in a thermoplastic styrene polymer and heating the resulting composition above the softening temperature of the styrene polymer. Frequently such styrene polymer foams are not as homogeneous as desired and may have relatively large cell sizes. Foams having large cell sizes tend to be brittle and otherwise deficient in certain important physical properties.

One method for preparing foamable styrene polymer compositions comprises steeping styrene polymer particles, films, ribbons, etc. in an aliphatic hydrocarbon such as pentane, petroleum ethers, etc. until the styrene polymer has absorbed the desired quantity of hydrocarbon, e.g., 3–10 weight percent. This process is extremely time consuming and up to 30 days may be required to absorb the liquid aliphatic hydrocarbon, cf., Example 5 of U.S. 2,681,321.

It is an object of this invention to provide foamable styrene polymer compositions which, when foamed, provide styrene polymer foams having fine cell sizes.

Another object of this invention is to provide an improved process for incorporating liquid aliphatic hydrocarbons in thermoplastic styrene polymers.

Other objects and advantages of this invention will be apparent from the following detailed description thereof.

In accordance with the present invention, foamable styrene polymer compositions which, when foamed, provide styrene polymer foams having fine cell sizes and improved properties are attained by intimately dispersing 3–10 parts of an aliphatic hydrocarbon and at least about 0.5 part of a finely divided inorganic pigment throughout 100 parts of a thermoplastic styrene polymer. Such foamable styrene polymer compositions can be prepared by intimately dispersing the finely divided inorganic pigment throughout the thermoplastic styrene polymer and subsequently steeping the styrene polymer in an aliphatic hydrocarbon.

The following examples are set forth to illustrate more clearly the principle and practice of this invention to those skilled in the art. Where parts and quantities are mentioned, they are parts and quantities by weight.

EXAMPLE I

Part A

One part of a yellow cadmium sulfide pigment having an average particle size of 0.3–0.4 micron is admixed with 100 parts of a finely ground polystyrene having a molecular weight of about 65,000. The externally blended mixture is extruded to obtain a uniform distribution of the pigment throughout the resin and then ground to a particle size of 8–20 mesh (U.S. Standard).

Part B

Part A is repeated employing a calcium carbonate pigment having an average particle size of about 0.1 micron in lieu of the cadmium sulfide pigment of Part A.

Part C

Part A is repeated employing an ultramarine blue pigment having an average particle size of about 5 microns in lieu of the cadmium sulfide pigment of Part A.

Part D

Part A is repeated employing a finely ground diatomaceous earth in lieu of the cadmium sulfide pigment of Part A.

Part E

Part A is repeated employing a silica pigment having an average particle size of about 0.02 micron in lieu of the cadmium sulfide pigment of Part A. The silica pigment employed is prepared by precipitation of a water glass solution with a calcium chloride solution followed by hydrochloric acid digestion of the resulting precipitate.

Part F

Part A is repeated employing a titanium dioxide pigment having an average particle size of about 0.3 micron in lieu of the cadmium sulfide pigment of Part A.

Part G

The polystyrene employed in Part A is extruded without incorporating any pigment therein and is ground to a particle size of 8–20 mesh.

EXAMPLE II

Part A 100 parts of the polymer from Example I, Part A and 100 parts of n-pentane are agitated in a stirred autoclave for 7 hours at 25° C. The polymer particles are separated from the excess pentane and have absorbed 5% pentane.

Part B

Part A above is repeated except that the time of steeping is extended to 24 hours. The polymer particles absorb 7.8% pentane.

Part C

To illustrate the effect that the inorganic pigment dispersed in the polystyrene has upon the rate of pentane absorption, Part B above is repeated except that the polystyrene particles from Example I, Part G (which contain no inorganic pigment) are employed in lieu of the polymer particles from Example I, Part A. The polymer paticles absorb 4.7% pentane. This result should be compared with Part A above, wherein the polymer particles containing the inorganic pigment absorb 5% pentane in 7 hours.

Part D

Part C above is repeated except that the time of steeping is extended to 48 hours. The polymer particles absorb 7.7% pentane. This result should be compared with Part B above, wherein the polymer particles containing the inorganic pigment absorb 7.8% pentane in 24 hours.

Part E

Each of the polymer particles from Parts A–D above are foamed by placing them in boiling water for three minutes. The densities of the foamed polymers are set forth in Table I.

TABLE I

| Polymer Identification | Percent Foaming Agent | Density of Foamed Resin; lbs./ft.³ |
|---|---|---|
| Part A | 5.0 | 6.4 |
| Part B | 7.8 | 2.9 |
| Part C | 4.7 | 9.7 |
| Part D | 7.7 | 6.1 |

In comparing the foamed resin produced from the composition of Part A with the foamed resin produced from the composition of Part C, it will be noted that, although both compositions contain substantially the same quantity of foaming agent, the resin containing the inorganic pigment has a materially lower density. A similar result is observed in comparing the foamed resins prepared from the compositions of Part B and Part D. In addition, the foamed resins containing the inorganic pigment have materially smaller cell sizes.

EXAMPLE III

The polymer particles from Example I, Parts B–F are steeped in n-pentane for 24 hours at 25° C. The resulting foamable polymer particles are foamed by the method described by Example II, Part E. In each case, the foamed resin particles have fine cell sizes and a density of less than 4 lbs./ft.$^3$.

EXAMPLE IV

Styrene polymer particles of 8–20 mesh (U.S. Standard) and containing, respectively 1% of the yellow cadmium sulfide pigment described in Example I, Part A and the diatomaceous earth described in Example I, Part D are steeped in n-pentane for 24 hours at 25° C. Control styrene polymer particles containing no inorganic pigment are steeped in n-pentane for 48 hours to absorb an equivalent quantity of foaming agent. The foamable polymer compositions are then stored in sealed glass jars for 6 months. Each of the foamable polymer compositions is placed in a perforated steel mold in a quantity sufficient to occupy 8% of the mold volume. Thereafter, the resins are heated for 3 minutes with steam to prepare a molded block of foamed polystyrene.

The foam prepared from the control foamable styrene polymer particles containing no inorganic pigment has a relatively coarse structure with the individual cells having an average diameter of 0.05–0.08″. The foams prepared from the foamable styrene polymer particles containing the cadmium sulfide pigment and the diatomaceous earth have a fine structure and an average cell size of 0.006–0.013″. Flexural strength and modulus of elasticity values as determined by ASTM procedure D790–49T are set forth in Table II.

TABLE II

| Inorganic Pigment in Foamable Particles | Flexural Strength, p.s.i. | Modulus, p.s.i. |
| --- | --- | --- |
| None | 13 | 235 |
| Cadmium Sulfide | 56 | 2,070 |
| Diatomaceous Earth | 61 | 2,120 |

EXAMPLE V

Part A

Polystyrene of 65,000 molecular weight and containing 1% of the silica pigment described in Example I, Part E is extruded into a sheet about 0.005″ thick. The resulting sheet is steeped in n-pentane for a period of time sufficient to absorb 5% pentane. When placed in boiling water for one minute, the sheet expands to a thickness of about 0.05″. The foamed sheet has a density of about 2 lbs./ft.$^3$ and a fine cell structure in which a majority of the cells have a diameter of about 0.01″.

Parts B–F

Part A above is repeated except that the silica pigment is replaced with, respectively, the yellow cadmium sulfide pigment, the calcium carbonate pigment, the ultramarine blue pigment, the titanium dioxide pigment and the finely ground diatomaceous earth described in Example I. In each case comparable results are obtained.

Part G

Part A above is repeated except that no inorganic pigment is included in the polystyrene sheet. The resulting foamed sheet has a density in excess of 3.0 lbs./ft.$^3$ and large cell sizes in which the diameter of the majority of the cells exceeds 0.03″.

EXAMPLE VI

A sheet of polystyrene of 65,00 molecular weight measuring 8″ wide and 0.15″ thick and having intimately dispersed therein 7% n-pentane and 1% of the silica pigment described in Example I, Part E is fed continuously through a steam chest 6 ft. long at a rate of 10 ft./minute. The sheet obtained has a fine cell size with a majority of the cells having a diameter of about 0.01 inch, a density of 2 lbs./ft.$^3$ and measures 28″ wide and 0.75″ thick.

The function of the inorganic pigment incorporated in the styrene polymer compositions of the invention appears to be essentially mechanical in nature rather than chemical. As a result, essentially any inorganic pigment may be employed in the invention provided that it is finely divided. In general, the inorganic pigment employed should have a particle size of not substantially greater than about 5 microns and especially good results are obtained when the inorganic pigment has an average particle size of one micron or less. It is also possible to employ inorganic pigments having larger particle sizes, e.g., up to 10–20 microns or even larger, although the benefits attained by the use of such pigments is not as great as those attained with smaller particle size pigments.

The term "pigment" is employed in the sense used in the rubber and plastic art to denote any inorganic compound or mixtures of inorganic compounds which are incorporated in a plastic material. The term is not restricted to inorganic compounds having tinctorial properties. Typical examples of the inorganic pigments that may be employed include carbon blacks, natural and treated clays, finely ground natural pigments such as limestone, bauxite, etc., multifarious inorganic colorants such as ultramarine blue, cadmium yellow, the ferrocyanide pigments, etc., the various commercially available water-insoluble inorganic salts such as calcium carbonate, calcium silicate, calcium sulfate, barium sulfate, etc., metallic oxides such as iron oxide, alumina, thoria, etc. Another very suitable inorganic pigment is diatomaceous earth, although by reason of its complex network type structure it is difficult if not impossible to ascribe a particular particle size to this pigment. The results attained with finely divided silica pigments prepared by precipitation from water-glass solutions are outstanding and the use of such pigments constitutes an especially preferred embodiment of the invention. Such silica pigments can be prepared by the method described in U.S. 2,692,869.

The inorganic pigments included in the compositions of the invention, depending upon their method of manufacture, may have water chemically or physically associated therewith. Such water has no deleterious effect upon the compositions of the invention and consequently there is no need to dry the pigments.

Only a small quantity of the finely divided inorganic pigment needs to be incorporated in the styrene polymer to attain the results which characterize the compositions of the present invention. A noticeable acceleration in the rate of absorption of aliphatic hydrocarbon in the steeping process and a reduction in the cell size of the styrene polymer foams is observed when as little as 0.5 part of the inorganic pigment is dispersed throughout 100 parts of the styrene polymer. The incorporation of more than about 8 parts of the inorganic pigment in 100 parts of the styrene polymer has little or no further effect in accelerating the rate of aliphatic hydrocarbon absorption or reducing the cell size of the resulting foamed resin. In some cases, however, larger quantities of the inorganic pigment may be incorporated in the styrene polymer for other purposes such as to reduce cost, to modify physical properties, to provide more intense colors, etc.

The inorganic pigment may be incorporated in and dispersed throughout the styrene polymer by conventional mixing methods or, if desired, in some cases inorganic pigments may be incorporated in the styrene monomer before it is polymerized.

The thermoplastic styrene polymers included in the compositions of this invention may be homopolymers of styrene or interpolymers of styrene containing a predominant preparation of styrene, i.e., greater than 50 weight percent and preferably greater than 75 weight percent styrene. Examples of alpha,beta-ethylenically unsaturated monomers that may be interpolymerized with the styrene include the conjugated 1,3-dienes, e.g., butadiene, isoprene, etc.; alpha,beta-ethylenically unsaturated carboxylic acids and derivatives thereof, e.g., acrylic acid, methyl acrylate, ethyl acrylate, 2-ethylhexyl acrylate, the corresponding esters of methacrylic acid, acrylamide, methacrylamide, acrylonitrile, methacrylonitrile, mono- and diesters of maleic and fumaric acid, etc.; vinyl esters of monobasic carboxylic acids, e.g., vinyl formate, vinyl acetate, vinyl stearate, etc.; olefins, e.g., ethylene, acenaphthylene, etc.; halogenated olefins, e.g., vinyl chloride, vinylidene chloride, etc.; vinyl ethers, e.g., vinyl methyl ether, vinyl butyl ether, etc. If desired, blends of a major amount, e.g., greater than 50 weight percent, of a styrene polymer with minor amounts, e.g., less than 50 weight percent, of other polymers may be employed, e.g., blends of a styrene polymer with a rubbery diene polymer, or the analogous compositions obtained by polymerizing styrene monomer in the presence of a rubbery diene polymer. In any of the above type resins, all or a portion of the styrene may be replaced with its closely related homologues such as alpha-alkyl substituted monovinylidene aromatic hydrocarbons, e.g., alpha-methylstyrene, alpha-ethylstyrene, etc.; ring-alkyl substituted monovinylidene aromatic hydrocarbons, e.g., o-, m- and p-vinyl-toluene, o-, m- and p-ethylstyrene, alpha-methyl-2,4-dimethylstyrene, 2,4-dimethylstyrene, etc.; ring-halogenated monovinylidene aromatic hydrocarbons, e.g., o-, m- and p-chlorostyrene, 2,4-dichlorostyrene, etc.; ring-alkyl substituted halogenated monovinylidene aromatic hydrocarbons, e.g., 2-chloro-4-methylstyrene, etc. In general, the styrene polymers employed should have a molecular weight in the range of about 40,000–100,000 as determined by the Staudinger method.

The aliphatic hydrocarbons included in the compositions of the invention boil within the range of from about 10° C. to about 100° C. and preferably within the range of from about 30° C. to about 80° C. Examples of such hydrocarbons include pentane, isopentane, cyclopentane, heptane, petroleum ethers boiling within the previously described temperature ranges, etc. It is permissible, and in some cases desirable, to admix other volatile organic liquids with the aliphatic hydrocarbon. In particular, good results frequently are obtained employing mixtures of 70–95 weight percent of an aliphatic hydrocarbon and, correspondingly, 30–5 weight percent of a normally liquid lower halogenated hydrocarbon such as methylene chloride. Normally the aliphatic hydrocarbon will be employed in amounts of about 3–10 and preferably about 5–8 parts per 100 parts of the styrene polymer.

The foamable styrene polymer compositions preferably are prepared by steeping a styrene polymer having an inorganic pigment homogeneously dispersed therein in an aliphatic hydrocarbon. The absolute rate of aliphatic hydrocarbon absorption is dependent upon the surface area per unit weight possessed by the styrene polymer containing the inorganic pigment. For this reason, the styrene polymer that is to be steeped, whether in the form of particles, films, filaments or sheets, should have at least one dimension which is not greater than about 5 millimeters.

One method for steeping the styrene polymers consists of simply contacting the styrene polymer containing the inorganic pigment with a large excess of the aliphatic hydrocarbon and separating the polymer therefrom after it has absorbed the desired quantity of the aliphatic hydrocarbon. In another embodiment of the invention, the styrene polymer containing the inorganic pigment and the aliphatic hydrocarbon may be dispersed in a large volume of water and heated to an elevated temperature, preferably in an autoclave. The steeping may be carried out at temperatures ranging from about 0° C. to the boiling point of the hydrocarbon or even higher if the steeping is carried out under pressure. At room temperature or above, agitation should be provided to prevent agglomeration of the styrene polymer particles or films.

The foamable polymer compositions of the invention can be prepared by alternate procedures if desired. For example, the inorganic pigment and the aliphatic hydrocarbon can be dispersed in styrene monomer which is subsequently polymerized. In still another embodiment of the invention the inorganic pigment and the aliphatic hydrocarbon can be dispersed within the thermoplastic styrene polymer by mechanical mixing as on rubber mills or in a Banbury mixer or in screw type extruders.

The above descriptions and particularly the examples are set forth by way of illustration only. Many other modifications and variations thereof can be made without departing from the spirit and scope of the invention herein described.

This application is a continuation-in-part of my co-pending application Ser. No. 559,502, filed January 16, 1956, now abandoned.

What is claimed is:

1. A solid particulate foamable thermoplastic polymer composition consisting essentially of 100 parts of a thermoplastic styrene polymer having intimately dispersed therein about 3–10 parts of an aliphatic hydrocarbon boiling within the range of about 30–80° C. and at least about 0.5 part of a finely divided inorganic pigment having an average particle size of not substantially greater than about 5 microns.

2. A composition as in claim 1 wherein the inorganic pigment is silica.

3. A composition as in claim 1 wherein the inorganic pigment is diatomaceous earth.

4. A composition as in claim 1 wherein the inorganic pigment is calcium carbonate.

5. A composition as in claim 1 wherein the inorganic pigment is cadmium sulfide.

6. A composition as in claim 1 wherein the inorganic pigment is ultramarine blue.

7. A solid sheet of a foamable thermoplastic polymer composition consisting essentially of 100 parts of a thermoplastic styrene polymer having intimately dispersed therein about 3–10 parts of an aliphatic hydrocarbon boiling within the range of about 30–80° C. and at least about 0.5 part of an inorganic pigment having an average particle size of not substantially greater than about 5 microns.

8. The method for preparing a foamable styrene polymer composition which consists of steeping a styrene polymer composition in an aliphatic hydrocarbon boiling within the range of about 10–100° C.; said styrene polymer composition consisting of 100 parts of a thermoplastic styrene polymer having at least about 0.5 part of a finely divided inorganic pigment intimately incorporated throughout the styrene polymer; said styrene polymer composition being in a physical shape having at least one dimension of not greater than about 5 millimeters; said inorganic pigment having a particle size of not substantially greater than about 5 microns.

9. The method of claim 15 in which 0.5–8 parts of the inorganic pigment are intimately incorporated in 100 parts of a styrene homopolymer.

10. The method of claim 9 in which the inorganic pigment incorporated in the styrene homopolymer is silica.

11. The method of claim 9 in which the inorganic pigment incorporated in the styrene homopolymer is diatomaceous earth.

12. The method of claim 9 in which the inorganic pigment incorporated in the styrene homopolymer is calcium carbonate.

13. The method of claim 9 in which the inorganic pigment incorporated in the styrene homopolymer is cadmium sulfide.

14. The method of claim 9 in which the inorganic pigment incorporated in the styrene homopolymer is ultramarine blue.

15. The method of claim 8 in which the styrene polymer composition is steeped in an aliphatic hydrocarbon boiling within the range of about 30–80° C.

References Cited in the file of this patent

UNITED STATES PATENTS

| | | |
|---|---|---|
| 2,577,743 | De Long | Dec. 11, 1951 |
| 2,744,291 | Stastny et al. | May 8, 1956 |
| 2,848,428 | Rubens et al. | Aug. 19, 1958 |
| 2,941,965 | Ingram | June 21, 1960 |